United States Patent [19]

Shores

[11] Patent Number: 5,356,706
[45] Date of Patent: Oct. 18, 1994

[54] RELEASE COATING FOR ADHESIVE TAPES AND LABELS

[76] Inventor: A. Andrew Shores, 212 Carroll Canal, Venice, Calif. 90291

[21] Appl. No.: 990,709

[22] Filed: Dec. 14, 1992

[51] Int. Cl.⁵ ................................................ B32B 7/12
[52] U.S. Cl. ................................. 428/352; 427/208; 427/208.4; 427/209; 427/387; 428/355
[58] Field of Search .................... 427/208, 208.4, 209, 427/387; 428/40, 41, 42, 352, 355

Primary Examiner—Bernard Pianalto

[57] ABSTRACT

An alkali dispersible copolymer is provided which is the reaction product of a di-omegaorgano functional dimethylsiloxane oligomer having terminal active hydrogen groups, a carboxyl group bearing monomer, and a diisocyanate. The copolymer provides good release per se from tacky adhesive masses or when combined with other film formers.

14 Claims, No Drawings

RELEASE COATING FOR ADHESIVE TAPES AND LABELS

BACKGROUND OF THE INVENTION

1. Field of the Invention

This invention relates in general to novel copolymeric materials suitable for use as a release agent or as a component in a release composition, and to methods for their preparation. It more particularly relates to coated substrates having a surface coated therewith such as release liners, pressure-sensitive adhesive tapes and pressure sensitive adhesive labels.

2. Description of the Prior Art

Pressure-sensitive adhesive tapes are generally manufactured and sold with the tape wound upon itself in convolutions to form a roll of some suitable length of tape. Consequently, when it is necessary to use the tape, it must be possible to unwind the desired length from the roll without excessive force or delamination of the backing, offsetting of the adhesive, or the like, regardless of the time or conditions under which the tape has remained in roll form prior to use. For these reasons, a coating known as a release coat or back size is generally provided on the back side of the tape backing member, i.e., the side opposite that on which the adhesive mass is applied. Such a coat, compared to an uncoated backing member, as is its objective, offers relatively low adhesion to the adhesive mass.

Although various release agents and compositions thereof have been developed over the years, none of them, to my knowledge, accomplish all the objects desired by their use. With some release agents, the release characteristics diminish with time, and particularly at high temperatures because of some chemical or physical change in the release material per se. Others interact with adhesive mass, sometimes merely physical, so that adhesion to various substrates to which the tape is applied is adversely affected.

The extension of the pressure-sensitive concept beyond its early more limited usage has spurred the need for, in certain applications, more aggressive adhesives. As a result there have been rather simultaneous demands for improved release coatings to permit suitable removal of the adhesive from the backing member at the time of application.

Whether a material will be suitable or not as a release agent, in particular for pressure-sensitive adhesive tapes, depends upon a number of factors. The lower the interfacial tension between the adhesive mass and the material used as a release coating, naturally the better release provided; however, low interfacial tension alone is not enough. The material, to be useful as a release coat, should also be of a suitable cohesive strength and possess good adhesion with the backing member.

In the early 1950's, silicones were introduced as coatings for paper substrates to provide release surfaces for tacky materials. One use for these coated substrates was as backing members for pressure-sensitive adhesives. The silicones are a class of synthetic materials which are composed primarily of alternating silicon and oxygen atoms in the polymeric backbone. A variety of organic groups can be attached to the silicon atoms to make up the polymers that are referred to as organopolysiloxanes. The simplest polysiloxane, polydimethylsiloxane, is one in which methyl groups are attached to the silicon atoms. The physical nature of these polymers, e.g., whether resin, rubber, or oil, depends on the degree of polymerization as well as upon the nature of the end groups in the polymer. These groups can be relatively inert chemically, e.g., the trimethylsiloxy group, or they can be chemically active. An example of the reactive type is the SiH group.

It has been known for many years now, as earlier indicated, that certain silicones (organosiloxane polymers), or formulations thereof, can be applied to the surface of paper, various films and other substrates to render the surface thereof adhesive (i.e., non-adherent) to sticky and tacky material. Exemplary of this prior art are U.S. Pat. Nos. 2,882,183; 3,050,411; 3,328,482; 3,518,325; 3,565,838; 3,671,484; and 3,823,025. Of these, U.S. Pat. No. 3,518,325 discloses that, optionally, an isocyanate having at least two isocyanate groups per molecule, or a reaction product of such an isocyanate with a polyhydroxy compound, can be included in the silicone composition.

Organo siloxane compounds of the type disclosed in these patents are, in general, liquid materials having mainly dimethylsiloxy repeating units with a few functional groups chemically bonded to the main polymer chain. The liquid polymer is applied in solvent solution or dispersion in water (e.g. emulsion) to which a catalyst such a dimethyl tin diacetate has been added. On evaporation of the solvent, or water a surface film of the liquid polymer is deposited which builds up in molecular weight, crosslinks, and a solid coating results. This process, called "cure", needs either high temperatures or long time at moderate temperatures.

The necessity for curing the polymeric material after deposition has placed certain restrictions on the use of various siloxane polymers. This is because the temperature needed for curing, at least to the extent desired, has often exceeded the temperature which a substrate on which a release coating is desired could withstand. This has been particularly true where the substrate is a paper-thermoplastic film laminate, care being needed to avoid melting or otherwise ruining the thermoplastic film.

A further disadvantage associated with silicone release polymers with which I am familiar is their relatively poor adhesion to the various substrates on which they are coated. This poor adhesion is thought to be due to the scarcity of polar groups in the organo siloxane polymer. Consequently, the use of a primer is often needed to obtain better anchorage of the silicone film to the substrate. The fact that silicone polymers have good release characteristics in itself is sometimes a problem in that too good a release is provided. Thus, there may be too easy unwind in tape rolls and, in some cases, the adhesion between the adhesive mass and release coat may be so low that the roll doesn't remain tightly wound.

Heretofore others have disclosed the manufacture of polysiloxane-urethane copolymers. In U.S. Pat. No. 2,511,310, there is disclosed linear polymers from the reaction of bifunctional organo-silicone compounds, e.g., of formula $R_2Si(OH)_2$ wherein R is a monovalent hydrocarbon radical, with diisocyanates and diisothiocyanates, the reaction being preferably conducted at temperatures of 35° to 200° C., in an inert, anhydrous solvent. The polymers are, in general, solids of high softening points, e.g., 195° C. and higher, and are soluble in, for example, phenol, and, in some cases, formic acid and benzene. The polymers disclosed in this patent are said to be useful in the preparation of fibers, films, and plastics.

There has also been developed in recent years organofunctional silicone fluids, e.g. silicone polycarbinols, which combine typical silicone properties, for example, release, with alcohol reactivity. The silicone polycarbinols can be chemically bonded into any system which is reactive toward alcohol to permanently impart desirable silicone properties to that system. Thus, there can be provided silicone modified polyesters, silicone modified sulfonate, silicone modified urethanes, silicone modified melamines, and silicone modified phenolics.

Another organofunctional silicone fluid developed is one containing mercapto end groups. These mercaptosilicone compounds are disclosed in U.S. Pat. Nos. 3,388,144 and 3,388,145 assigned to Dow Corning Corporation. As disclosed in the latter patent (Example 1) a mecaptopolysilicone having a viscosity of about 50–60 cs at 25° C. can be used as a mold release agent for synthetic rubber. Compounds of the type disclosed in 3,388,145 can also be chemically bonded to rubber to give anti-blocking characteristics to uncured rubber stock thus obviating the need for, e.g., talc.

In U.S. Pat. No. 3,725,000 (Dow) there is disclosed a polysilicone lubricating finish for Spandex fibers in which a radical is provided on the polysiloxane containing an isocyanate reactive group, e.g. isocyanate, amino, hydroxyl, and mercapto groups, reactive with the Spandex fibers. Thus, when the polysiloxane finish is applied to the fibers, apparently a chemical bond results between the two which is believed responsible for the non-migrating characteristics of the lubricating finish.

Other prior art of which applicant is aware are U.S. Pat. Nos. 3,170,891 and 3,509,193. The former patent is directed to an organosilicone isocyanate. As disclosed therein, the isocyanate radical of such a compound will react with any active hydrogen, such as a hydrogen attached to oxygen, nitrogen, and sulfur. The invention in the latter patent is directed to the manufacture of a mercaptomethyl substituted organopolysiloxane useful as a water-repellant impregnating agent.

Moreover, it has been suggested heretofore to use a silicone release agent in combination with a film forming resin, e.g. melamine or urea formaldehyde resin. Such a mixture is disclosed in U.S. Pat. No. 3,061,567. Thus, it has been found with such a composition that the organic resin is apparently preferentially absorbed on the substrate surface on which the release composition is deposited. This allows the silicone to be concentrated on the surface, thereby making for better release. For a given release less silicone is needed. The ratio of organosiloxane to organic resin in the mixture, as disclosed by the patentee, is not critical and can vary over a wide range.

In U.S. Pat. No. 4,002,792 I disclosed a release agent for adhesive tapes made from a mercato and methoxy terminated silicone reacted with a diisocyanate. The resulting polythiourethane can be applied from a solvent solution to the backing member of an adhesive tape. The solvent is subsequently removed by heat and the polymer is allowed to crosslink through its methoxy groups with ambiant moisture to provide a release coating.

All the prior art known to me discloses either water insoluble silicone compositions, low molecular weight fluid oligomers, solvent solutions, water emulsions of oligomers, and long or high temperature curing condition.

SUMMARY OF THE INVENTION

The above-mentioned disadvantages with organosiloxane release compounds can be largely eliminated by the modified silicone polymers disclosed herein.

It is accordingly an object of the present invention to provide a polyorganosiloxane suitable for use as release agents which offer improved properties over those heretofore available.

It is a further object of the invention to provide improved backsize compositions comprising the release agent herein disclosed and a film former.

It is a further object of the invention to provide a pressure-sensitive adhesive tape in which the backing member hereof is coated on its backside with the improved release agent of this invention.

It is a further object of this invention to provide an improved process for manufacturing a pressure sensitive adhesive tape and pressure sensitive adhesive label.

The release agents of this invention are copolymeric materials which result, in the basic aspect, from the reaction between an active Hydrogen (H) terminated linear polydimethylsiloxane oligomer, a diisocyanate, an organic monomer with 2 active Hydrogens and 1 or 2 COOH groups, and an amine to solubilize the copolymer in water. An active H terminated difunctional organic monomer without COOH groups is often also part of the monomer composition. Active H are meant to be H-containing groups that readily react with isocyanates, examples of such groups being OH, SH, $NH_2$. Thus, the compounds of this invention are prepared, in general, by the copolymerization reaction of at least three components. The first component, which will sometimes be referred to as component A, is a linear dimethylsiloxane oligomer having hydroxyl, thiol, primary amine or secondary amine functionality at each of the two ends of the molecule. These groups are bonded to the polydimethylsiloxane mid block through an intermediate alkylene or alkyleneoxy group. The Si—C linkage, unlike the Si—O—C linkage, provides hydrolitic stability to the molecule. The second component (component B) is a difunctional organic compound terminated at each end with isocyanate groups (e.g. diisocyanate), the isocyanate groups being reactive with the active hydrogen of the OH, SH, or NHR (R=H or alkyl) group of the components A and C. The third component (component C) is a carboxyl (COOH) functional organic monomer with two active Hydrogens. Optionally, another component (component D) may be incorporated, which is an organic monomer with 2 active Hydrogens and no COOH.

An advantage of this invention is that the copolymer of this invention is water soluble. It can be coated to various substrates from an aqueous solution thus circumventing all the disadvantages of coating from a solvent: cost, air pollution, health hazard, fire hazard, and solvent sensitive backings.

A still further advantage is that the copolymer of this invention, unlike silicone emulsion of the prior art, can be diluted down with water to 1%, and, in some cases, even to 0.1% solids, and still wet out on plastic films, providing good release in pressure sensitive adhesive tapes.

The polymer of this invention, and this is of particular advantage, can be coated onto various substrates without need for any further chemical buildup for their functioning as a film forming release coating. The release coats need not be subjected to curing heretofore deemed necessary with silicone release coats. Thus, high curing temperatures or long processing (curing) times can be avoided thereby lending greater advantage in, e.g., pressure-sensitive adhesive tape manufacture. One particular advantage resulting from this feature is the fact that the release agent of this invention can be used with various heat-sensitive substrates. As the release agent can be used in release compositions comprising other film formers, the number of different film formers that can be used is also enhanced by this feature.

The release agents of this invention offer good adhesion with various substrates particularly those used conventionally as backing members in pressure-sensitive adhesive tape manufacture. Moreover, consistent release is provided even with those adhesives which are considered aggressively tacky.

The copolymer of this invention is alkali soluble or dispersible but water insoluble. That means that it can be dissolved or dispersed in water containing an alkali, such as an amine (or ammonia). If the alkali is removed from the solution the copolymer precipitates out. This is exactly what happens following the coating of a backing with a copolymer of this invention solubilized in water with a small quantity of an amine. When water is removed from the backing by heat, the amine is also removed at the same time and the release coating becomes insensitive to water. On the other hand, silicone emulsions contain water soluble surfactants that are not removed from the release coating on drying and curing, which make them water sensitive in the adhesive tape.

A still further advantage of the release copolymer of this invention, is that unlike silicones, it provides adequate but not too easy release to pressure sensitive adhesives. Tape adhesion to its own (release coated) backing is good and the copolymer more readily accepts inks for printing.

The copolymers of this invention are advantageously characterized by a combination of properties not found in either moiety alone. The silicone portion, though in relatively minor proportions in the copolymer, contributes highly desirable release characteristics.

The urethane segments contribute polar groups to the copolymer which, in turn, provide good adhesion, without need for a primer, between the release agent and various substrate materials. The copolymer portions are linked together with these divalent polar groups, e.g., carbamate, urea, and thiocarbamate. These groups and aromatic groups introduced by the diisocyanate component, and the COOH groups introduced with component C increase the glass transition temperature and render the polymer solid when they are present in sufficient amount.

characteristics. However, as little as 0.5% polydimethylsiloxane block content derived from the component A provides useful level of release. There is no upper limit except the one that is determined by the stochiometry of the reaction with the other comonomers and the level of COOH content. Practically, the polydimethylsiloxane content is usually less than 90% and most often less than 80%. For most release applications the polydimethylsiloxane content is between 2 and 60% and the great majority of these being between 10 and 45%.

The proportion of the diisocyanate, providing the hard segments for the copolymer is generally in the range of 10–70%, and most are in the range of 20–50%.

The amount of component C in the copolymer of the invention is also important since it provides alkali solubility through its carboxyl groups. Useful amounts of COOH content in the copolymer was found to be in the 1–12% range. Lower amounts are not enough to solubilize the copolymer in water while larger proportions render the coating water sensitive. The preferred range is 1.5–8% COOH.

It also appears that the copolymer may be of low molecular weight (e.g. low viscosity in solution), and still functions well as a release agent.

Optionally, the copolymer of this invention may be crosslinked. This is normally not necessary but may be desirable when the silicon content of the release composition is very high. Suitable crosslinking agents are, for example, multivalent metal compounds, such as Chromic nitrate, Zinc acetate and poly aziridine compounds. These crosslinking agents crosslink the copolymer through their COOH groups instantaneously on evaporation of water from a backing member on which it had been coated.

Not to be overlooked in the advantages offered by the copolymer of this invention is the fact that advantageous release properties can be obtained at a cost much less than that of a release agent which is solely a silicone homopolymer. Moreover, satisfactory release in some applications can be obtained even more cheaply by blending the release agent of the invention with a further, and less costly, film former. When the film former is of greater surface tension than the siloxane-urethane copolymers of the invention, the copolymer material will bloom to the surface and the coating or backsize composition will exhibit release characteristics determined by the release agent component.

In satisfaction of the foregoing objects and advantages, there is provided a novel class of copolymeric release agents for, inter alia, pressure-sensitive adhesive tapes, the silicone-urethane copolymers of which may be described by the following general formula comprising the repeating units:

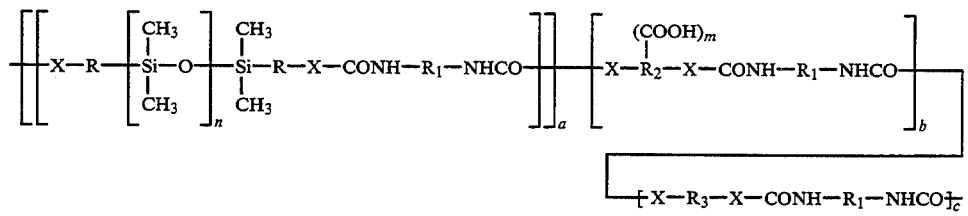

The nature and amount of components B, C, compared to the amount of component A, determine the degree of hydrophobicity, and release from, e.g., pressure-sensitive adhesive masses. In general, the greater the proportion of component A, the better the release wherein X is a divalent radical selected from the group consisting of —S—, —NH—, >N-Alkyl, —O-(-CH$_2$CHR$_4$O-)$_p$, wherein R$_4$ is H or CH$_3$ and p=0–100, R is a simple divalent aliphatic hydrocarbon radical, $R_1$ is a divalent hydrocarbon radical selected from the group consisting of aliphatic and aromatic hydrocarbons, $R_2$ is a tri or tetravalent radical with 4 or more carbon atoms, $R_3$ is a divalent radical with 2 or more carbon atoms, $n=2-200$, preferably $n=5-100$, $m=1$ or 2, a,b and c represent the number of recurring units and chosen as to obtain said copolymer with polydimethylsiloxane block content of at least 0.5%, carboxyl content of 1–12% and the ratio $c/(a+b)$ 0 to 0.5.

A process for manufacturing a pressure sensitive adhesive tape or label is also disclosed. It comprises the steps of:

i. Providing an alkali soluble urethane-siloxane copolymer comprising the reaction product of a composition comprising in admixture:

A. a di-omegaorganofunctional dimethylsiloxane olipomer represented by the formula

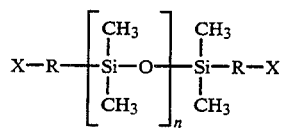

(I)

wherein $n=2-200$, preferably $n=5-100$, R is simple divalent aliphatic hydrocarbon radical, and X is an active Hydogen containing a radical selected from the group consisting of a. —SH,
b. —NHR, wherein R is H or simple alkyl, and
c. —O—(CH$_2$CHR$_4$O)$_p$—H, wherein $R_4$ is H or CH$_3$ and $p=0-100$, preferably 0–30;

B. an aromatic or aliphatic diisocyanate,

C. an organic monomer with 1 or 2 carboxyl group and 2 active Hydrogen functionality selected from the group consisting of —OH,—SH-,—NH$_2$ and —NH-Alkyl, and optionally D. an organic momomer having 2 active Hydrogens selected from the group consisting of —OH,—SH,—NH$_2$ and —NH-Alkyl; and solubilizing said copolymer in water with an amine;

ii. Coating a backing member with a solution comprising a major proportion of water and a minor proportion of said copolymer, iii. Removing the water from the backing by heat, and iiii. Coating the other side of the backing with a pressure sensitive adhesive.

There is further provided by this invention novel pressure-sensitive adhesive tapes and labels containing these copolymeric materials or compositions thereof on the backing member as a release coat.

DETAILED DESCRIPTION OF THE INVENTION AND THE PREFERRED EMBODIMENTS

This invention relates to linear copolymers formed by an addition type reaction between a diisocyanate and active Hydrogen containing compounds. Usually, the synthesis is carried out in 2 steps. In the first stage of the reaction an isocyanate terminated prepolymer is formed by reacting an omega organofunctional dimethylsilicone oligomer and carboxyl containing monomer with a stochiometric excess of a diisocyanate. The oligomer and the monomer have the following structure:

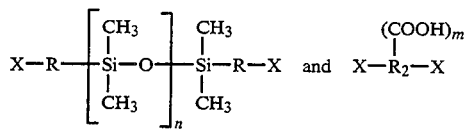

wherein $n=2-200$, R is a simple divalent aliphatic hydrocarbon radical, such as proplene, X is selected from the group consisting of —OH, —SH, —NH, —NH-Alkyl, —O—(CH$_2$—CH$_2$O)$_p$—H and —O—(CH$_2$CHCH$_3$O)$_p$—H, $R_2$ is a tri or tetravalent radical, $p=0-100$, and m is 1 or 2. Optionally, another organic monomer having 2 active Hydrogens selected from the group consisting of —OH,—SH,—NH$_2$ and NH-Alkyl may also be coreacted with the diisocianate in the reaction mixture. Examples of such compounds are 1,4-butanediol, triethyleneglycol, OH, SH and NH$_2$ terminated polyalkylene ethers and polyesters.

This reaction may be carried out neat or in the prescence of a solvent to reduce viscosity. Heat or catalyst may be used to speed up the reation, although mild reaction conditions, generally below 100° C., are preferrable to avoid reacting the COOH groups with the NCO groups. Suitable solvents are organic liquids containing no active Hydrogen capable of reacting with the diisacyanate. Examples of solvents are N-2-methylpyrrolidone, N,N'-dimethylformamide, acetone, dioxane.

In the practice of the invention, a mixture of the reactants can be prepared by mixing and stirring the various reactants together.

As the reaction tends to be exothermic, it may be only necessary to mix the various components together and permit the temperature to rise to the exotherm temperature and further adjusting the temperature with or without the intentional addition of heat or cooling. The reaction is conducted under anhydrous conditions for such a time at the selected temperature that is practical to provide the desired results.

The quantity of organic diisocyanates to be used in the invention is dependent upon the quantity of active hydrogen groups in reactant components A, C and D, the particular diisocyanate compound used, the molecular weight of the diisocyanate, the NCO/OH ratio, etc. All of these factors, while influencing the amount of diisocyanate to be used are easily taken into account by one skilled in the art to determine the precise amount of NCO groups required in any particular formulation.

The initial stochiometric ratio of NCO to total OH is generally between 1.3–2.5, usually 1.4–2.

If desired, catalysts that are normally used to accelerate the NCO reaction can be employed in the instant invention. The use of a catalyst is particularly useful to accelerate the secondary OH/ortho NCO reaction, the SH/NCO reaction and reactions of aliphatic isocyanates. These catalysts include tertiary amines such as triethylamine, tributylamine, pyridine, N-methylmorpholine, and organometallic compounds such stannous octoate, dibutyl tin dilaurate, zinc octoate and cobalt naphthenate. Combinations of two or more of the above catalysts can be used, as is well known. The use of a catalyst or combination thereof in the practice of this invention, however, is immaterial to the basic aspects of the invention.

The NCO terminated prepolymer thus prepared is then further reacted with an aliphatic diamine, diol or dithiol to form a copolymer. This reaction is called "chain extension". The total NCO/Total Active H ratio is adjusted to approximately 1:1. In a preferred embodiment of this invention a primary or secondary diamine as well as a tertiary amine is dissolved in water and the prepolymer is poured into it while stirring. The diamine chain extends the prepolymer to form the copolymer almost instantaneously while the tertiary amine interacts with the COOH of the copolymer and solubilizes it in water. Typical diamines for chain extension are: isophorone diamine, omega amino polyether, aminoethyl-piperazine, polymethylene diamine, xylylenediamine.

The chain extension reaction may also be done prior to solubilizing in water. However, in order to avoid the buildup of high viscosity during the formation of the copolymer, the temperature must be considerably increased or a large amount of solvent must be added to the reactants, or both. None of these options are usually desirable. However, if the chain extension is carried out with a diol, this is the only option, since diols do not react with isocyanates much faster than water which would compete with the diol.

Alternatively, the copolymer of this invention may also be prepared in one step by reacting the ingredients A,B,C and optionally D, simultaneously. However, this method results in the formation of a random copolymer, rather than the block copolymer obtained with the 2-step reaction. In a one-step copolymerization the use of large amounts of a solvent is necessary to reduce viscosity. As with the prepolymer method, the copolymer thus formed may be solibilized in water with the help of ammonia or an amine. If a low boiling solvent, such as acetone, was used in the preparation of the copolymer, it may be conveniently distilled off.

The water solution of the copolymer, prepared usually at a concentration of 20-40%, can be diluted further with water to provide a solution of the desired concentration, for example 0.25 to 5% by weight solids, for coating. This dilute water solution can be cast on a substrate and the water is evaporated, thereby casting a thin film of the copolymer on the substrate. No cross-linking is necessary to obtain functional properties. A small amount of solvent, such as isopropyl alchohol, may be added, if desired.

The polysiloxane-urethane compounds of this invention are characterized by their molecular weights by means of intrinsic viscosity when measured at 30° C. in a solvent such as tetrahydrofuran. Intrinsic viscosity as low as 0.05 provided good release characteristics.

The dimethylorganosiloxane oligomer used in the practice of the invention, and its method of manufacture, is not in and of itself a part of my invention. Hydroxy terminated oligemers may be conveniently prepared by reacting a linear polydimethyl siloxane oligomer having SiH endings with an allylalcohol-alkylene oxide condensate: $CH_2=CH-CH_2-O+CH_2-CHRO)_{\overline{n}}H$. Thiol and amino terminated silicones may be prepared by reacting a linear polydimethyl siloxane oligomer havin SiH endings with allyl chloride to form a compound with $\equiv Si-CH_2CH_2CH_2Cl$ endings and further reacting with ammonia, an amine or $H_2S$ to provide a primary amine, secondary amine or thiol ended oligomer.

As is well known in the art, polyurethanes are formed by the reaction of an isocyanate group with an active Hydrogen. Thus, when component B reacts with components A,C and D, a urethane linkage is formed. More specifically, if the active H group is OH, the new linkage formed is called carbamate while SH forms thiocarbamates and amines form ureas.

Any of the isocyanates heretofore used for the formation of polyurethanes are suitable for the purposes of the present invention provided they are diisocyanates. Polyisocyanates are to be avoided as they mainly result in undesirable cross-linking reactions while monoisocyanates form low molecular, essentially monomeric compounds. Those diisocyanates which can be used in the practice of the invention, in general, include aliphatic diisocyanates, aromatic diisocyanates, cycloaliphatic diisocyanates, etc., the primary consideration being that component B be at least and only difunctional. In addition, mixtures of two or more species, kinds and types of the isocyanate functional component can be employed.

Examples of diisocyanates that can be employed in the instant invention include toluene-2,4-diisocyanate, a mixture of toluene-2,4- and toluene-2,6-diisocyanate, metaphenylenediisocyanate, methylene-bis-phenylisocyanate (MDI), hydrogenated MDI, isophorone diisocyanate, and hexamethylene diisocyanate. Other than the previously named diisocyanates compounds, diisocyanate terminated prepolymers can also be used.

Copolymers in accordance with the invention can be used in a wide variety of applications. One of the preferred uses is as a release coat in the manufacture of pressure-sensitive adhesive tapes. However, the copolymers can also be used as release coatings on papers and other substrates, and as parting agents in molds, etc. The copolymers will also find use as water and grease repellant surfaces on papers, textiles, metals, plastics, etc.

The copolymeric release agents of this invention can be used alone or they can be mixed with various other film forming materials to form a release or backsize composition. Such a composition is of particular advantage, as satisfactory release properties in some instances can be provided much more economically, for example, when the substrate coated is relatively porous as is the case of a paper backing member in the manufacture of pressure-sensitive adhesive tape. The release agent is present in the release composition in only a minor percentage by weight, e.g., in the order of from 1 to 10%. Thus, as the siloxane release agent is the more expensive component of the release compositions, its use therein results in considerable savings. As the silicone copolymers of the invention need not be cured to be a satisfactory release material, the release copolymers can be intermixed with various film formers including those which heretofore could not withstand the silicone curing temperatures, and therefore could not be used. The silicone release copolymers of this invention can be intermixed with epoxy resins, polyesters, polyvinylacetate, ethylene vinylacetate copolymers, polyamides, polyacrylics, polyurethanes, polyvinylchloride and their mixtures and other film forming resins dispersed as emulsions or latices in water.

In general, it will be found that when mixing the reaction products of this invention with another film former, the greater the difference between the film former surface tension and that of the siloxane-urethane copolymer, the better will be the release characteristics of the release composition. This is because the siloxane copolymer, the lower surface tension component in the composition, migrates to the outer surface of a coating of the composition. Thus, the greater the difference in surface tension between the two components of the release composition, the better release properties provided. There should be, for optimum results, a difference of at least 10 dynes/cm.

The polysiloxane-urethane release agent or composition can be applied to various substrates depending on the application intended, and by various means. Where the substrate is fibrous, e.g., papers and textile fabrics, the polymeric material can be applied by such operations as immersion, spraying, brushing, and roll coating. The more complete the coverage naturally the better the results obtained.

After a layer of the solution is established on the desired substrate, heat and moving air is, in general, applied to volatize water and any solvent, thereby leaving a deposit or coating of the release agent or composition on the substrate. The heat necessary to accomplish the desired evaporation depends on the air velocity and the particular solvent used. This can easily be determined by those skilled in the art for any particular situation. The prime consideration is that the volatiles evaporation be complete.

As earlier mentioned, the copolymeric materials of this invention have been found to be extremely useful as release agents for pressure-sensitive adhesive tapes. Thus, a further aspect of the invention comprises a pressure-sensitive adhesive material which includes a pressure-sensitive adhesive on one side of the backing member and the novel release coating agents or compositions thereof as herein before described, on the other side. There may optionally be included a primer coating on the front side or surface of the backing material in order to improve its surface bonding characteristics to the pressure-sensitive adhesive which is applied thereon. Quite advantageously, however, there need be no primer or tie-coat on the back surface of the backing member in order to provide the desired bonding characteristics of that surface to the release coating composition applied thereon. The invention is also inclusive of rolls of pressure-sensitive adhesive tape of suitable width and length converted from the adhesive material.

The pressure-sensitive adhesive composition can comprise any elastomeric material such natural or synthetic rubber, examples of which include polyisobutylene, polybutadiene, polychloroisoprene, polyisoprene, ethylene-propylene polymers, copolymers of butadiene and acrylonitrile, butadiene and styrene, styreneisoprene, polyacrylates, ethylene-vinyl acetate copolymers, block copolymers of styrene with isoprene and styrene with butadiene, and other synthetic and natural rubbers or elastomers. The elastomers described may be used separately or in combination. The adhesive composition usually includes resinous components known as tackifying agents. Examples of tackifying agents include polyterpene resins, hydrocarbon resins, polymerized or disproportionated rosin esters, wood rosin, oil soluble phenolic resins and the like.

Other components which may be, and are conventionally, included in the pressure-sensitive adhesive compositions include fillers such as clays, diatomaceous earth, silica, talc, titanium dioxide, calcium carbonate, etc.; anti-oxidants, as for example, zinc oxide, butyl zimate, polyhydric phenols and their alkyl derivates, diaryl amines, metal chelating agents, etc.; and plasticizers such as mineral oil, lanolin, liquid polybutenes or polyacrylates.

The pressure-sensitive adhesive composition is preferably applied to the backing member, which may or may not have a primer coating thereon, in the form of a solvent solution or emulsion in water. However, it may also be applied as a hot-melt adhesive. The solvent may be any solvent for the particular pressure-sensitive adhesive, including toluene, xylene, alphatics low boiling naphthas, ketones, and chlorinated hydrocarbons.

The adhesive composition is applied to the backing material by any convenient method, as by calendaring, extrusion, kiss roll coating, etc. The solvent or emulsifying liquid, where the composition contains these, is removed from the adhesive composition by evaporation by heating. This is accomplished, as in the case of application of the release composition, by air drying, by passage through a circulating hot air oven, by passage over steam heated cans, or other conventional means. The coating and drying means used, or available, will, of course, largely determine the percent solids of the coating composition and solvent. The adhesive material is then generally wound on itself for storage and for slitting into rolls of suitable width and length.

The weight of the pressure-sensitive adhesive composition (on a dry basis) is preferred to be in the range of between about 0.5-4.0 ounces per square yard of backing member, but may be outside this range if required for specific purposes.

As to the backing member, any material ordinarily used for this purpose may be used with the particular material chosen dependent on the end use for the pressure-sensitive adhesive tape. Examples of suitable backing materials include fibrous and non-fibrous materials which may be made by weaving, compounding, extruding, etc., as for example, backing materials such as paper, cotton and other cellulosic materials, plastics such as polyolefins, acetates, vinyl halides, polyalkylene and polyester films, glass fabrics, metal foils, etc. The papers can, if desired, be saturated, or impregnated with various materials such as latex, natural or synthetic. The backings can also be combination backing members, e.g., an impregnated paper laminated to a plastic film or metal foil.

The invention will be further illustrated and described by reference to the following specific examples. The proportions here and elsewhere are expressed as parts by weight unless specifically stated to the contrary.

EXAMPLE 1

The following ingredients were changed into a reactor: 2,4-toluene diisocyanate, 41.2 (473.6 mEq.NCO) and N-2-methylpyrrolidone, 40.0. The mixture was stirred and 2,2'-dimethylol propionic acid, 13,4 (200 mEq.OH),, was sifted slowly into the mixture. An exothermic reaction resulted and outside cooling was applied to maintain temperature below 70° C. When the exotherm subsided 1,4-butanediol, 0.99 (22.0 mEq.OH), was then added while cooling was applied. Following the cooling of the reaction mixture to 35° C. the silicone oligomer of Formula (I), 39.0 (42.5 mEq.OH) was stirred in. It contained a linear dimethyl siloxane block portion of 1100 molecular weight, (n=14), bonded at each of the two ends with —$CH_2CH_2CH_2O$-($CH_2$ $CH_2O$-)$_7$-H. The mixture was let to react at 65° C. for 2 hours to let all the OH groups consume. The initial NCO/OH was 1.79 and 209 mEq.NCO remained unreacted.

The prepolymer was then chain extended by pouring it into the following solution while stirring vigorously: water, 234, Jeffamine 230, 25.4 (221 mEq.$NH_2$) and N,N'-dimethyl-2-ethanolamine, 5.9 (66.3 mMole). A clear solution of copolymer of this invention resulted with a viscosity of 1500 cps and pH=8. Ammonia, 2.5, was then added, and the viscosity got reduced to 600 cps and the pH increased to 9.

Jeffamine 230, is a Texaco Chemical Company tradename of polyoxypropylene diamine with a general formula of $H_2NCHCH_3CH_2-(OCH_2CHCH_3)_pNH_2$ and 230 molecular weight.

A small amount of the reaction product solution was withdrawn and the water was allowed to evaporate therefrom at 150° C. A translucent brittle residue remained. Its infrared spectra showed typical bands of a siloxane urethane copolymer. The dimethyl siloxane moiety of the copolymer constitutes 19% of the total weight of the copolymer which contained 3.7% COOH.

Intrinsic viscosity, measured in a mixture (9/1 by volume) of tetrahydrofuran/ethanol was determined to be 0.15.

EXAMPLE 2

A 1 mil Mylar A polyethyleneterephthalate film (available from DuPont) was coated with a laminating cement based on nitrile rubber, polychloroprene and zinc resinate.

Solvent evaporation in a forced air oven resulted in a dried adhesive film 1.5 oz/yd$^2$. A woven glass cloth having 32 warp yarns per inch and 8 fill yarns per inch was then superimposed on the dried adhesive layer and was thereby laminated to the polyester film. This was accomplished by passing the superimposed layers together through the nip formed by a pair of steel rolls.

The film side of the film-cloth lamination was then back-sized with a 0.5% solution of the release agent of Example 1 made by diluting the solution therein with water. The release composition was applied with a 1 inch diameter bar tightly wound with a 5 mil wire. Solvent was driven off with forced air at 200° F. leaving a thin release layer on the polyester film.

To the other side of the laminate was then applied a hot melt pressure-sensitive adhesive composition which had been prepared by mixing together at 350° F. the following components: styrene-isoprene-stryrene block copolymer, 100, polyterpene resin of 90° C. melting, 100, glycerol ester of hydrogenated rosin of 5° C. melting, 30, antioxidant, 2. The adhesive composition heated to 350° F. was extrusion coated onto the woven glass cloth at a thickness of 2.4 oz/sq. yd.

The adhesive material thus produced was wound upon itself (60 yards) and slit into 1 inch wide pressure-sensitive adhesives tapes.

The adhesive tapes were then subjected to various tests, as below indicated, to determine the comparative performance characteristics of a pressure-sensitive adhesive tape using a release coat in accordance with the invention. Prior to testing, the adhesive tapes were each submitted to accelerated aging conditions as follows: Dry Heat Aging: In a forced air oven at 150° F. for 7 days. Wet Heat Aging: Tape immersed in water at 150° F. for 7 days.

All testing was then done at 72° F. 50% R.H. The following results were obtained:
  Wet Heat, Unwind Adhesion of Tape at 150 ft/min: 28 oz./in.
  Wet Heat, Readhesion to Released Backing, 12"/min: 32 oz/in
  Dry Heat, Adhesion to Steel: 132 oz/in,
  Dry Heat, Quick Stick to Steel: 29 oz/in.

These results are considered excellent and even somewhat better than the ones normally obtainable with other release agents. The important feature of the release polymer of this invention is that it accumulates all the desirable features of other release agents without having any of their drawbacks: excellent release characterstics, coating from a water solution (instead of a solvent), no curing needed on the backing member, low usage of release agent, good readhesion to the (release coated) backing, good but not too easy release on unwind, acceptance of certain printing inks and absence of transfer of release polymer to the adhesive that would decrease adhesion values.

EXAMPLES 3

This example illustrates another combination of monomers that can be used to obtain copolymers in accordance with the invention and the excellent release characteristics obtained with various pressure-sensitive adhesive tapes.

The first step of the polymerization was carried out by dissolving tartaric acid, 18.0 (240 mEq-OH), in a solution of MDI (methylane-bis-4-phenylisocyanate), 50 (400 mEq-NCO) and acetone, 40, and reacting as in Example 1. A thiofunctional silicone of the formula I, wherein A is $CH_2CH_2CH_2$, X is SH and n=51, 50 parts (25 mEq-SH), was stirred in along with stannous octoacte catalyst, 0.1. When all the active H's were reacted with the NCO's (the total NCO/OH=1.51), the reaction mixture was poured into a stirring solution containing the following ingredients: Isophorone diamine, 5.59 (143 mEq-$NH_2$), 2-dimethylamino-2-methyl-1-propanol, 14.0 (120 mM), and water, 232, to obtain a copolymer solution of 30% total solids, 1200 cps viscosity and pH=8.5.

The copolymer had polydimethyl siloxane content of 38%, COOH content of 8.7% and intrinsic viscosity of 0.1. It had excellent release characteristics both in pressure sensitive adhesive label and tape applications with various pressure sensitive adhesives. It also had excellent water repelling properties, when coated out onto substrates from a dilute water solution and dried, without necessitating curing.

EXAMPLES 4-5

To show the utility of the release agents, according to the invention, with different adhesive formulations, a backsized latex-saturated crepe paper and a corona treated oriented polypropylene (OPP) film were release coated, as in Example 2, with the copolymer prepared in Example 1. The paper backing was adhesive coated with a solvent bases natural rubber and styrenebutadiene rubber base adhesive tackified with rosin ester tackifiers, dried in an oven, wound upon itself and slit into ¾" wide rolls of tape (masking application). The polypropylene backing was coated with an acrylic emulsion of pressure sensitive adhesive, dried in oven, wound upon itself and slit into 2" wide rolls of tape (packaging application).

Each of the two tapes were then adhered to a 2"×6" rigid steel plate. Another strip of the same tape was then applied and adhered on top of it (adhesive against release layer). The adhesive strips were rolled down three times in each direction, with a 4½ lb. rubber covered steel roller, and dry aged, as described in Example 2.

The tapes adhering to the release coating of the tapes adhering to the steel plate (upper tape) were tested for adhesion properties. This testing was accomplished using an Instron Tester at a 90° angle and 50 inches per minute separation. The peeled tapes were then reapplied to a stainless steel (SS) plate to measure quickstick (PSTC-3) and adhesion to stainless steel (PSTC-1). These values are compared with the results obtained with not release coated backings (control). The adhesion values (oz/in) obtained were as follows:

Paper Tape To Paper Tape: 22
Paper Tape To Same Paper But Not Release Coated: 46
OPP Tape To Same: 18
OPP Tape To OPP Not Release Coated: 54
Paper Tape Separated From Release Same And Reapplied to SS: 28
Paper Tape, As Is, To SS: 29
OPP Tape Separated From Same And Reapplied To SS: 64
OPP Tape, As Is, To SS: 61

The data indicates that good release properties are found with the release agent of the invention with a variety of adhesive formulations and backings.

EXAMPLE 6

The release agent of Example 1 was blended at the 4% (dry/dry) level with Geon 552, a water emulsion of PVC manufactured by the B. F. Goodrich Chemical Co.

The formulation was coated onto a latex impregnated paper backing member in an amount to provide a dry weight of 0.4 oz/yd.². This was accomplished by heating the coated paper to remove water and fuse the backsize.

The backsize coated backing member was then coated with the rubber base adhesive mass set forth in Examples 4–5, after which the mass coated sheet was slit to 1 inch wide rolls of tape. These were oven aged for 16 hours as in Example 2 ("Dry Heat") and tested for unwind and adhesion. The results are indicated below:

Unwind Adhesion: 22 oz/in
Adhesion to SS: 28 oz/in

It is seen that incorporating a relatively small amount of release agent according to the invention with a film former to form a release composition results in good unwind characteristics.

The invention has been more particularly described in the various examples as a release agent per se or as a component of a release coating composition for pressure-sensitive adhesive tapes. By virtue of its adhesive properties, however, the copolymeric material of this invention will be found suitable in numerous applications. It can be used, inter alia, as a coating for fibrous containers, conveyor belts, and various coverings and items which come into contact with such sticky and tacky materials such as bread dough, rubber, candy, plastics, the adhesive undersurface of linoleum and the like during manufacture, transportation, and storage of these materials. Other uses include as a mold release coating and as a release surface from various substrates; water repellant coating in paper, textile, and metal finishing, an antiblock and slip agent for inks and coatings, and as an internal lubricant for plastic compositions.

What I claim is:

1. A process for manufacturing a pressure sensitive adhesive tape or label comprising the steps of i. providing an isocyanate terminated prepolymer comprising the reaction product of a composition comprising in admixture:
A. a di-omegaorganofunctional dimethylsiloxane oligomer represented by the formula:

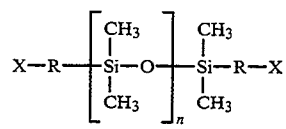

wherein n=2–200, R is a simple divalent aliphatic hydrocarbon radical, and X is an active Hydrogen containing radical selected from the group consisting of
a. —SH,
b. —NHR, wherein R is H or simple alkyl, and
c. —O-(-CH$_2$CHR$_4$O-)$_p$H, wherein R$_4$ is H or CH$_3$ and p=0–100;
B. an aromatic or aliphatic diisocyanate,
C. a carboxyl containing diol of the general formula

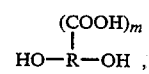

wherein R is a trivalent or tetravalent radical with 4–16 carbon atoms, m=1 or 2, and optionally
D. an organic monomer having 2 active Hydrogens selected from the group consisting of —OH, —SH, —NH, —NH-Alkyl
ii. chain extending said prepolymer with an aliphatic primary or secondary diamine and solubilizing the copolymer formed in water, with a tertiary amine;
iii. coating a backing member with a solution comprising a major proportion of water and a minor proportion of said copolymer;
iiii. removing the water from the backing by heat and
iiiii. coating the backing with a pressure sensitive adhesive.

2. Process according to claim 1 wherein R is —CH$_2$CH$_2$CH$_2$—, and n is about 14 and X is —O(CH$_2$CH$_2$O)$_p$H, wherein p=0–30.

3. Process according to claim 1 wherein said diisocyanate is aromatic.

4. Process according to claim 1 wherein said diisocyanate is selected from the group consisting of isomers of toluene diisocyanate, isomores of methylene-bis-phenylisocyanate, hexamethylene diisocyanate, isophorone diisocyanate and hydrogenated methylene-bis-phenylisocyanate.

5. Process according to claim 1 wherein said diol is 2,2'-dimethylol propionic acid or tartaric acid.

6. Process according to claim 1 wherein said optional organic monomer is a diol.

7. Process according to claim 1 wherein said diamine is selected from the group consisting of isophorone diamine, amino-teminated polyether, menthane diamine, aminoethylpiperazine, polymethylene diamine, xylylene diamine.

8. Process according to claim 1 wherein the prepolymer is the reaction product of a composition comprising in admixture:

A. a di-omegaorganofunctional dimethylsiloxane oligomer represented by the formula:

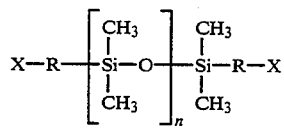

wherein n is about 14, R is —CH$_2$CH$_2$CH$_2$—and X is —O(CH$_2$CH$_2$O)$_p$—H, wherein p=0-30, B. a diisocyanate selected from the group consisting of isomers of toluene diicyanate, isomers of methylene-bis-phenylisocyanate, isomers of hydrogenated methylene-bis-phenylisocyanate and isophorone diisocyanate, C. 2,2'-dimethylol propionic acid or tartaric acid, and optionally D. a diol selected from the group consisting of butanediol, triethylene glycol, polyether diol and polyester diol; and said prepolymer is chain extended in water, in the presence of a tertiary amine, with a diamine selected from the group consisting of polyether diamine, isophorone diamine, polyalkylene diamine and xylylene diamine.

9. Process according to claim 8, wherein the integer p of siloxane olygomer is 7 or 14, a diol of group D is part of the reaction mixture, the polydimethylsiloxane block content is 10-45% and the carboxyl content of the copolymer is 1.5-8%.

10. Process according to claim 1 comprising the additional step, following chain extension, of mixing a minor amount of said copolymer with a major amount of a film former polymer dispersed in water.

11. Process according to claim 10 wherein said film former is selected from the group consisting of polyvinylchloride, polyacrylates, polyesters, epoxies, vinyl acetate and a copolymers of vinyl acetate with ethylene.

12. A process for manufacturing a pressure sensitive adhesive tape comprising the steps of:

i. providing an alkali soluble urethane-siloxane copolymer comprising the reaction product of a composition comprising in admixture:

A. a di-omegaorganofunctional dimethylsiloxane oligomer represented of the formula

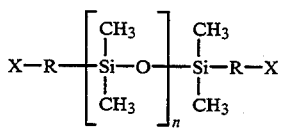

wherein n=2-200, R is simple divalent aliphatic hydrocarbon radical, and X is an active Hydrogen containing radical selected from the group consisting of a. —SH, b. —NHR, wherein R is H or simple alkyl, and c. —O—CH$_2$CHR$_4$O—$_p$H, wherein R$_4$ is H or CH$_3$ and p=0-100;

B. an aromatic or aliphatic diisocyanate,

C. an organic monomer with 1 or 2 carboxyl group and 2 active Hydrogen selected from the group consisting of —OH, —SH, —NH$_2$ and —NH-Alkyl, and optionally D. an organic monomer having 2 active Hydrogens selected from the group consisting of —OH, —SH, —NH$_2$ and —NH-Alkyl; and solubilizing said copolymer in water with a tertiary amine, ii. coating a backing member with a solution comprising a major proportion of water and a minor proportion of said copolymer, iii. removing the water from the backing by heat and iiii. coating the other side of the backing with a pressure sensitive adhesive.

13. A pressure sensitive adhesive tape comprising a backing member, a pressure sensitive adhesive on the front side thereof, and a release agent of the backside thereof, said release agent comprises the reaction product of a composition comprising in admixture:

A. a di-omegaorganofunctional dimethylsiloxane oligomer represented by the formula

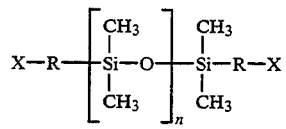

wherein n=2-200, R is simple divalent aliphatic hydrocarbon radical, and X is an active Hydrogen containing a radical selected from the group consisting of a. —SH, b. —NHR, wherein R is H or simple alkyl, and c. —O(CH$_2$CHRO)$_p$—H, wherein R$_4$ is H or CH$_3$ and p=0-100;

B. an aromatic or aliphatic diisocyanate,

C. an organic monomer with 1 or 2 carboxyl group and 2 active Hydrogen selected from the group consisting of —OH,—SH, —NH$_2$ and —NH-Alkyl, and optionally D. an organic monomer having 2 active Hydrogen selected from the group consisting of —OH, —SH, —NH$_2$ and —NH-Alkyl.

14. A pressure sensitive adhesive tape comprising a backing member, a pressure sensitive adhesive on the front side thereof, and a release agent on the backside thereof, said release agent is an alkali soluble linear block copolymer of the general recurring formula:

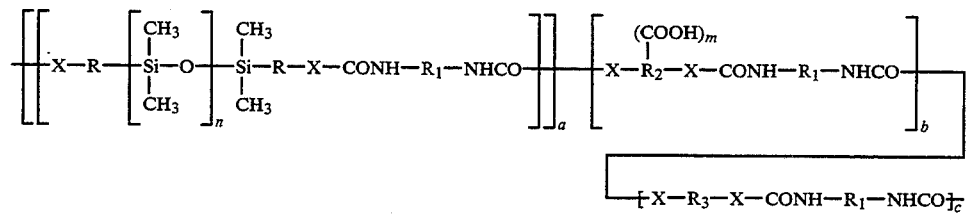

wherein X is a divalent radical selected from the group consisting of —S—, —NH—, >N-Alkyl, —O(CH$_2$CHR$_4$O)$_p$—, wherein R$_4$ is H or CH$_3$ and p=0–100, R is a simple divalent aliphatic radical, R$_1$ is a divalent aliphatic or aromat divalent radical, R$_2$ is a tri or tetravalent radical with 4 or more carbon atoms, R$_3$ is a divalent radical with 2 or more carbon atoms, n=2–200, m=1 or 2, a, b, and c are integers chosen as to obtain said copolymer with polydimethylsiloxane block content of at least 0.5% carboxyl content of 1–12% and c/(a+b)=0–0.5.

* * * * *